United States Patent [19]

Staton et al.

[11] Patent Number: 4,731,196

[45] Date of Patent: Mar. 15, 1988

[54] PROCESS FOR MAKING BLEACH ACTIVATOR

[75] Inventors: James S. Staton, Pride; Patrick C. Hu, Baton Rouge, both of La.

[73] Assignee: Ethyl Corporation, Richmond, Va.

[21] Appl. No.: 923,891

[22] Filed: Oct. 28, 1986

[51] Int. Cl.[4] .......... C09K 3/00

[52] U.S. Cl. .......... 252/184; 252/186.33; 252/95; 252/99; 252/140; 252/174.19; 252/174.23; 252/174.24; 502/60; 502/62; 502/87

[58] Field of Search .......... 252/186.33, 184, 95, 252/99, 140, 174.19, 174.23, 174.24; 502/60, 62, 87

[56] References Cited

U.S. PATENT DOCUMENTS

| | | | |
|---|---|---|---|
| 3,398,096 | 8/1968 | Das et al. | 252/95 |
| 3,532,634 | 10/1970 | Woods | 252/95 |
| 4,096,081 | 6/1978 | Phenicie et al. | 252/140 X |
| 4,379,080 | 4/1983 | Murphy | 252/174.24 X |
| 4,414,130 | 11/1983 | Cheng | 252/140 |
| 4,430,243 | 2/1984 | Bragg | 252/91 |
| 4,430,246 | 2/1984 | Sorbe et al. | 252/140 |
| 4,478,733 | 10/1984 | Oakes | 252/99 |
| 4,481,129 | 11/1984 | Oakes | 252/186.41 |
| 4,488,980 | 12/1984 | Oakes | 252/99 |
| 4,536,183 | 8/1985 | Namnath | 8/107 |
| 4,539,132 | 9/1985 | Oakes | 252/95 |
| 4,568,477 | 2/1986 | Oakes | 252/99 |
| 4,578,206 | 3/1986 | Walker | 252/95 |
| 4,601,845 | 7/1986 | Mamnath | 252/99 |
| 4,620,935 | 11/1986 | Baxter et al. | 252/99 |
| 4,623,357 | 11/1986 | Urban | 8/107 |
| 4,626,373 | 12/1986 | Finch et al. | 252/186.33 X |
| 4,655,782 | 4/1987 | McCallion et al. | 252/140 X |

FOREIGN PATENT DOCUMENTS

| | | | |
|---|---|---|---|
| 25608 | 3/1981 | European Pat. Off. | 252/186.33 |
| 2149316 | 6/1985 | United Kingdom | 252/186.33 |

*Primary Examiner*—Matthew A. Thexton

*Attorney, Agent, or Firm*—Donald L. Johnson; John F. Sieberth; J. D. Odenweller

[57] ABSTRACT

A manganese exchanged Zeolite A laundry bleach activator is made in a single reaction vessel by mixing dry Zeolite A with an inorganic acid in an amount to lower the pH to 8.0–10.5, adding and mixing in an aqueous manganese (II) salt, adding and mixing in a chelating agent such as sodium tripolyphosphate, adding and mixing in a binding agent such as carboxymethylcellulose, mixing and adding water to cause the Mn-exchanged Zeolite A, chelating agent and binder to agglomerate to form small granules and drying the resulting small granules for use as a bleach activator in laundry detergent compositions.

14 Claims, No Drawings

PROCESS FOR MAKING BLEACH ACTIVATOR

BACKGROUND OF THE INVENTION

Bleach is commonly used to whiten soiled fabrics during laundry operations. The most common bleach is aqueous sodium hypochlorite referred to as chlorine bleach. Chlorine bleach is effective and cheap but has certain disadvantages. It cannot be mixed with the detergent in a single package. It tends to attack certain dyes and also degrades fabrics. In addition, fabrics having a resin finish (wash and wear fabrics) are given a noticeable yellow tint by chlorine bleach.

In order to overcome these disadvantages, another class of laundry bleach has come into use. This class is referred to as peroxygen bleach. These materials are very effective whitening agents and are much safer with dyed fabrics. In addition they do not yellow wash and wear fabrics. Many can be packaged together with a detergent and other components to form a single detergent-bleach laundry package.

Although peroxygen bleaches have these many attributes, they have several drawbacks. They are more expensive compared to chlorine bleach and also are not effective unless the wash solution is at a temperature high enough to activate the peroxygen compound. For example, sodium perborate requires a water temperature above about 160° F. which is higher than that usually attained in domestic (U.S.A.) laundry operations. In order to lower the temperature at which peroxygen bleach can be used, one alternative is to use "bleach activators". These are compounds that by themselves have no bleaching action but when used in combination with a peroxygen bleach form a peroxygen compound which is more effective at lower temperatures than the initial peroxygen bleach. Examples of such bleach activators are tetraacetylethylenediamine, sodium p-acetoxybenzene sulfonate and sodium p-heptanoyloxybenzene sulfonate.

It has also been reported that in certain metal cations, in particular manganese (II), are excellent activators for peroxygen bleaching agents such as sodium percarbonate and sodium perborate. They are most effective when used in combination with a compound that releases carbonate anions into the aqueous wash solution (Oakes, U.S. Pat. No. 4,481,129).

More recently it has been reported (Namnath, U.S. Pat. No. 4,536,183) that use of soluble manganese (II) cations as bleach activators can stain the fabric due to the oxidation of the manganese to a higher valence state. The presence of a strong oxidizing agent in the laundry wash solution (such as sodium hypochlorite) can oxidize the Mn(II) to Mn(IV) which can adhere to the fabric causing it to take on a brownish appearance. Namnath solved this problem by incorporating the Mn(II) cation into a solid silicon support (e.g. zeolite) which prevents the manganese from depositing on the fabric.

Namnath prepares the silicon supported manganese bleach activator by (a) dissolving a water soluble manganese (II) salt and a solid silicon support in a solvent;
(b) adjusting the pH to achieve a value from 7.0 to 11.1;
(c) separating the solid composition;
(d) washing the solid composition to remove any traces of free manganese (II) salts; and
(e) drying the solid composition to remove solvent and moisture.

Alternatively, the solid silicon support material can be placed in a water solution of the manganese (II) salt to absorb the manganese cations and the resulting slurry of the solid manganese exchanged silicon support spray dried. The zeolite supported manganese (II) is shown by Namnath to be a very effective activator for perborate bleach.

SUMMARY OF THE INVENTION

Zeolite A which has been cation exchanged or impregnated with Mn(II) cations is more easily used in commercial laundry detergent compositions when the Mn-Zeolite A is agglomerated with an organic binder into very small pellets prior to mixing with the other ingredients in the laundry composition. The impregnation and agglomeration can be conducted in a single reaction vessel without isolation of any intermediate products by following a particular sequence of operations.

DESCRIPTION OF THE PREFERRED EMBODIMENTS

A preferred embodiment of the invention is a process for making a manganese (II) exchanged zeolite for use as an activator for a peroxygen laundry bleach, said process comprising:

(a) adding about 1000 parts by weight of an initial Zeolite A powder to a mixing vessel;
(b) slowly adding about 100–600 parts by weight of aqueous sulfuric acid which contains an amount of $H_2SO_4$ sufficient to lower the pH of the mixture to about 7.0–10.5 while mixing to obtain a damp Zeolite A powder;
(c) slowly adding an aqueous manganese (II) salt solution in an amount to provide at least 2–50 parts by weight of manganese per 1000 parts of Zeolite A while mixing to form a damp Mn-exchanged Zeolite A;
(d) adding and mixing in about 50–1500 parts by weight of a chelating agent;
(e) adding and mixing in 0–1000 parts of a binding agent;
(f) slowly adding water in an amount sufficient to agglomerate the blend into small granules while mixing; and
(g) drying the granules to obtain a peroxygen bleach activator.

Zeolites are alumina silicates having particular crystalline structures. Zeolites have the empirical formula:

$$M_{(2/n)}O:Al_2O_3:XSiO_2:YH_2O$$

wherein M is a metal cation which has valence n. A particular zeolite will have its own set of values of X and Y that fall in a defined range. The sodium form of Zeolite A has the average composition:

$Na_2O:Al_2O_3:2SiO_2:4.5H_2O$.

The various zeolites are articles of commerce. Zeolite A is used as a detergent builder in low or no phosphorus laundry detergents. In this use they absorb or exchange calcium and magnesium cations to remove the cations from water. In the following detailed discussion of the invention, Zeolite A (herein designated "ZA") will be used with the understanding that other zeolites could be used in its place. Commercial ZA has a mean particle size in the range of about 0.5–7 microns.

Initially the ZA and a mineral acid (e.g. $H_2SO_4$, HCl, $H_3PO_4$ and the like) are mixed to form a damp ZA having a pH in the range of about 7.0–10.5. This is preferably accomplished by charging the ZA to a mixing vessel and then slowly adding aqueous sulfuric acid while mixing. More even application of the acid is obtained by spraying the acid over the ZA during the mixing operation. The aqueous sulfuric acid should be about 1–30 weight percent $H_2SO_4$, Wl more preferably about 3–30 weight percent $H_2SO_4$, still more preferably 3–10 weight percent and most preferably about 4–7 weight percent $H_2SO_4$.

Addition of the acid is continued until the pH of the ZA drops into the range of 7.0–10.5. Using 5.8 weight percent aqueous $H_2SO_4$ this will require about 100–600 parts by weight aqueous sulfuric acid per 1000 parts by weight ZA. The exact amount is not important as long as it contains enough $H_2SO_4$ to adjust the pH into the 7–10.5 range. The product at this stage is still fairly dry and is referred to as "damp ZA powder".

Next, an aqueous Mn(II) salt solution is added to the damp ZA powder. The Mn(II) salt can be any Mn(II) salt that is soluble in water such that at least 2 weight percent Mn(II) cation solution can be dissolved. Some examples of such salts are $MnCl_2$, $MnBr_2$, $MnSO_4$, $Mn(NO_3)_2$, Mn acetate, manganese ammonium sulfate and the like. The preferred Mn(II) salts are $MnCl_2$ and $MnSO_4$, This solution is also preferably sprayed onto the vigorously stirred damp ZA powder. The aqueous Mn(II) solution preferably contains about 2–30 weight percent Mn(II) cations and more preferably about 3–10 weight percent Mn(II) cations. Aqueous Mn(II) solutions containing 5–50 weight percent $MnSO_4$ or $MnCl_2$ give good results. The amount of aqueous Mn(II) solution should be an amount which provides about 2–50 parts by weight Mn(II) cation for each initial 1000 parts by weight ZA, more preferably about 5–30 parts by weight Mn(II) and most preferably about 8–15 parts by weight Mn(II) cation per each initial 1000 parts by weight ZA. The ZA at this stage is referred to as "Mn-exchanged ZA" but part of the Mn(II) is probably impregnated or coated on the surface of the ZA so the term "Mn-exchanged ZA" is not used in a strictly technical sense but only to designate the product at this stage of the process.

At this stage it is preferred that a chelating agent be added to stabilize the Mn(II) cations and prevent their oxidation to a higher valence which would discolor the product. Useful chelating agents include sodium tripolyphosphate, sodium citrate, sodium nitrilotriacetate, sodium salt of ethylene diamine tetraacetic acid, sodium pyrophosphate, sodium carboxymethyloxysuccinates or their acids. The most preferred chelating agents are sodium tripolyphosphate and sodium citrate. They can be dry blended into the Mn-exchanged ZA. A useful amount is about 50–1500 parts sodium tripolyphosphate per 1000 parts of initial ZA. A more preferred amount is about 100–900 parts per 1000 parts initial ZA and a most preferred range is about 200–700 parts of sodium tripolyphosphate per 1000 parts initial ZA. Mixing is continued until a homogenous mixture is obtained.

A binding agent is then preferably added to the mixture. These are materials which will cause the mixture to agglomerate into small pellets upon subsequent addition of water. Useful binders include carboxymethylcellulose, polyvinylpyrrolidone, alkyl polyglycoside, polycarboxylate, cornstarch, polyacrylate and other polymeric compounds. The amount of binding agent should be an amount sufficient to provide the desired physical properties, such as attrition resistance and rate of dispersion, to the dried pellets. The resultant blend should agglomerate into pellets of about 2–200 mesh upon the addition of water with mixing. With carboxymethylcellulose or polyvinylpyrrolidone, this is accomplished with about 30–400 parts by weight carboxymethylcellulose per 1000 parts initial ZA. A preferred range is about 50–200 parts by weight carboxymethylcellulose per 1000 parts of initial ZA.

At this stage or an earlier stage a dye may be added to enhance the color of the final product.

Water is then added while vigorously mixing which causes the blend to agglomerate into small pellets. The amount of water can range from about 0–200 parts by weight per 1000 parts initial ZA depending on the amount of water added in earlier steps and the compositon of the blend.

A major advantage of the present process for making the Mn-exchanged ZA bleach activator is that all of the foregoing operations are conducted in a single mixing vessel. This eliminates the need to first adjust the pH and impregnate or cation exchange the ZA in an aqueous manganese salt solution, separate the manganese exchanged ZA from the aqueous solution by filtration or centrifugation, dry the manganese exchanged ZA and then blend in the chelating agent and binder to agglomerate the mixture.

The following examples illustrate the manner in which the process is conducted.

EXAMPLE 1

To a mixing vessel was charged 3.725 Kg of sodium ZA (Ethyl Corporation). While mixing, 993.6 grams of 5.8 weight percent $H_2SO_4$ was sprayed onto the dry ZA to give a pH of 9.5. Then 590 grams of a 20 weight percent aqueous $MnSO_4$ solution was sprayed onto the ZA while continuing to mix to give a Mn(II)-exchanged ZA. The mixture at this stage is still fairly dry. Then 1.5 Kg of sodium tripolyphosphate was added and the mixture thoroughly blended to form a homogenous mass. Next, 500 g of carboxymetaylcellulose was added and the mixture blended until homogeneous. About 0.5 liters of water were added causing the blend to agglomerate into small pellets (mostly 10–45 mesh). The pellets were then dried in an air stream at 80° C. and screened to remove fines and oversize particles.

EXAMPLE 2

In a mixing vessel was placed 1865 grams of sodium ZA (Ethyl Corporation) and a small amount of dye. While mixing at high speed, 500 grams of 3.0 weight percent aqueous sulfuric acid was added to the ZA to give a pH of 9.5. Following this while still mixing at high speed, 128 grams of a 20 weight percent aqueous $MnSO_4$ solution was added and thoroughly blended. Next 430 grams of sodium tripolyphosphate was added and mixed for 2 minutes. Then 215 grams of corn starch binder was added and while mixing at high speed, 225 ml of water was slowly added causing the mass to agglomerate into fine granules. The granules were dried for 25 minutes in a fluidized bed drier at 80° C.

We claim:

1. A process of making a manganese (II) exchanged zeolite for use as an activator for a peroxygen laundry bleach, said process comprising:

(a) adding about 1000 parts by weight of Zeolite A powder to a mixing vessel;

(b) slowly adding about 100–600 parts by weight of sulfuric acid which contains an amount of $H_2SO_4$ sufficient to lower the pH of the mixture to about 7.0–10.5 while mixing to obtain a damp Zeolite A powder;

(c) slowly adding an aqueous maganese (II) salt solution in an amount to provide 2–50 parts by weight of manganese per 1000 parts of initial Zeolite A while mixing to form a damp Mn-exchanged Zeolite A;

(d) without separating or drying said solid damp Mn-exchanged Zeolite A, adding and mixing in about 50–1500 parts by weight of a chelating agent;

(e) adding and mixing in a binding agent in an amount sufficient to provide the desired physical properties;

(f) slowly adding water in an amount sufficient to agglomerate the blend into small granules while mixing; and (g) drying the granules to obtain a peroxygen bleach activator.

2. A process of claim 1 wherein said Zeolite A powder in step (a) has a mean particle size in the 0.5 to 7.0 micron range.

3. A process of claim 2 wherein said sulfuric acid in step (b) has a concentration of about 3–30 weight percent $H_2SO_4$.

4. A process of claim 3 wherein said manganese (II) salt is selected from $MnCl_2$ and $MnSO_4$.

5. A process of claim 4 wherein said binding agent in step (e) is selected from carboxymethylcellulose, polyvinylpyrrolidone and corn starch.

6. A process of claim 5 wherein said chelating agent is selected from sodium tripolyphosphate, and sodium citrate.

7. A process of claim 6 wherein said manganese (II) salt solution contains about 5–50 weight percent of $MnSO_4$, $MnCl_2$ or mixture thereof.

8. A process of claim 7 wherein the dried granules from step (g) are about 90 weight percent in the size range of 2–200 mesh.

9. A process of claim 8 wherein the amount of sodium tripolyphosphate chelating agent is in the range of about 50–1500 parts per 1000 parts of initial Zeolite A.

10. A process for making a manganese (II) exchanged zeolite for use as an activator for a peroxygen laundry bleach, said process comprising:

(a) adding about 1000 parts by weight of Zeolite A to a mixing vessel, (b) spraying said Zeolite A with 3–10 weight percent aqueous sulfuric acid while mixing and in an amount to adjust the pH of the mixture into the range of 7–10.5 and to form a damp Zeolite A powder, (c) spraying said dump Zeolite A powder with an aqueous Mn (II) salt solution containing about 2–30 weight percent of Mn (II) cations while mixing and in an amount which provides about 2–50 parts by weight of Mn (II) cations for each 1000 parts of said Zeolite A and forms a damp Mn-exchanged Zeolite A, (d) without separating or drying said damp Mn-exchanged Zeolite A, adding and mixing in a chelating agent, (e) adding and mixing in a binding agent in an amount to provide an agglomerated final product upon addition of water, (f) mixing the blend vigorously while adding water if required to cause the blend to agglomerate into small granules of about 2–200 mesh and (g) drying said small granules to obtain a per oxygen bleach activator.

11. A process of claim 10 wherein said Mn (II) salt solution is an aqueous $MnCl_2$ or $MnSO_4$ solution containing about 3–10 weight percent of Mn (II) cations.

12. A process of claim 11 wherein said chelating agent is sodium tripolyphosphate.

13. A process of claim 12 wherein said sodium tripolyphosphate is added in an amount which provides about 100–900 parts per each initial 1000 parts by weight of Zeolite A.

14. A process of claim 12 wherein said binding agent is selected from carboxymethylcellulose or polyvinylpyrrolidone.

* * * * *